(12) United States Patent
Tomono

(10) Patent No.: US 10,498,911 B2
(45) Date of Patent: Dec. 3, 2019

(54) DISPLAY DEVICE, IMAGE PROCESSING DEVICE AND NON-TRANSITORY RECORDING MEDIUM

(71) Applicant: KONICA MINOLTA, INC., Tokyo (JP)

(72) Inventor: Kazuaki Tomono, Okazaki (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/210,221

(22) Filed: Dec. 5, 2018

(65) Prior Publication Data

US 2019/0215406 A1 Jul. 11, 2019

(30) Foreign Application Priority Data

Jan. 9, 2018 (JP) .................................. 2018-001126

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ....... *H04N 1/0044* (2013.01); *H04N 1/00148* (2013.01); *H04N 1/00167* (2013.01)

(58) Field of Classification Search
CPC ............. H04N 1/0044; H04N 1/00148; H04N 1/00167

USPC ................................ 358/1.1, 1.15, 1.13, 1.14
See application file for complete search history.

(56) References Cited

U.S. PATENT DOCUMENTS

2013/0176222 A1 7/2013 Tanaka
2015/0378520 A1* 12/2015 Chandrasekaran ... G06F 3/0482 715/716
2017/0060381 A1* 3/2017 Hanada ..................... G09G 5/00

FOREIGN PATENT DOCUMENTS

JP 2005156627 A 6/2005
JP 2013140504 A 7/2013

* cited by examiner

*Primary Examiner* — Douglas Q Tran
(74) *Attorney, Agent, or Firm* — Buchanan Ingersoll & Rooney PC

(57) ABSTRACT

A display device, with a display part having a rectangular display area, capable of changing an orientation of the display part between a first orientation and a second orientation rotated by 90 degrees from the first orientation, comprises: a hardware processor that: detects whether the orientation of the display part is either the first orientation or the second orientation; displays a first screen on which an operation screen operable for a user is arranged on a whole surface of the display area on the display part when the orientation of the display part is the first orientation; and displays a second screen on which reduced the operation screen is arranged in a part of the display area and a content included in the operation screen is arranged in a remaining part of the display area on the display part when the orientation of the display part is the second orientation.

23 Claims, 13 Drawing Sheets

FIG. 5

CONTENT REGISTRATION INFORMATION 28

| OPERATION SCREEN (28a) | CONTENT (28b) | DISPLAY POSITION (28c) | EXTRACT DISPLAY SETTING (28d) | PRIORITY (28e) |
|---|---|---|---|---|
| OPERATION SCREEN A | CHARACTER STRING A | (X1, Y1) ; (X2, Y2) | ON | Low |
| | CHARACTER STRING B | (X1, Y1) ; (X2, Y2) | OFF | — |
| | ⋮ | ⋮ | ⋮ | ⋮ |
| | OPERATION BUTTON A | (X1, Y1) ; (X2, Y2) | ON | High |
| | OPERATION BUTTON B | (X1, Y1) ; (X2, Y2) | ON | High |
| | ⋮ | ⋮ | ⋮ | ⋮ |
| OPERATION SCREEN B | CHARACTER STRING A | (X1, Y1) ; (X2, Y2) | ON | Low |
| | CHARACTER STRING C | (X1, Y1) ; (X2, Y2) | OFF | — |
| | ⋮ | ⋮ | ⋮ | ⋮ |
| | OPERATION BUTTON X | (X1, Y1) ; (X2, Y2) | ON | High |
| | OPERATION BUTTON Y | (X1, Y1) ; (X2, Y2) | ON | High |
| | ⋮ | ⋮ | ⋮ | ⋮ |

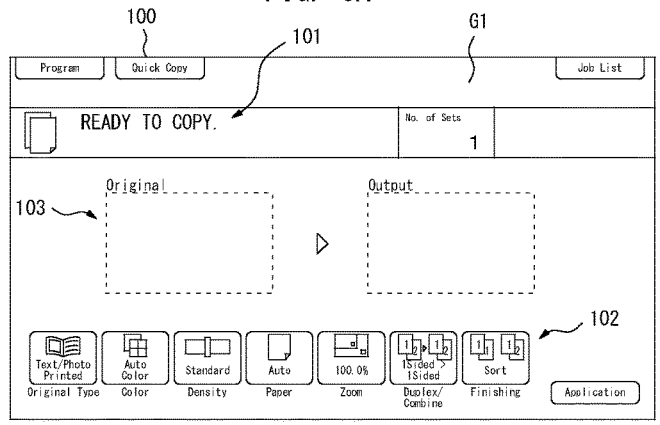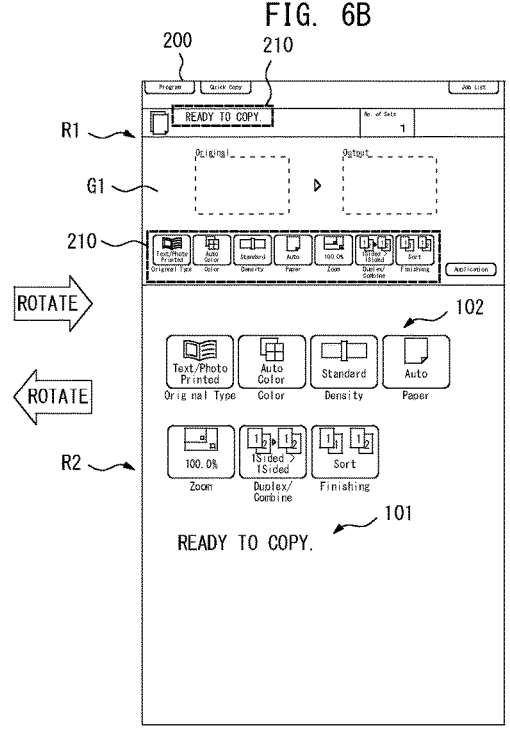
FIG. 6A
FIG. 6B

SWITCH TAB →

← SWITCH TAB

FIG. 13A
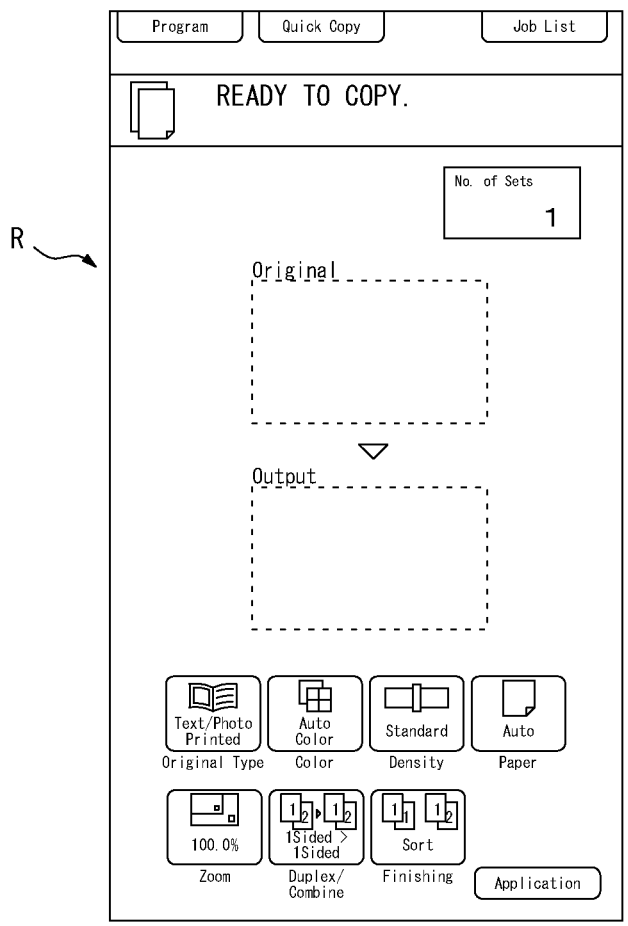
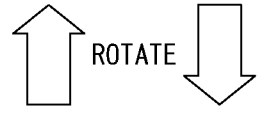
ROTATE
FIG. 13B
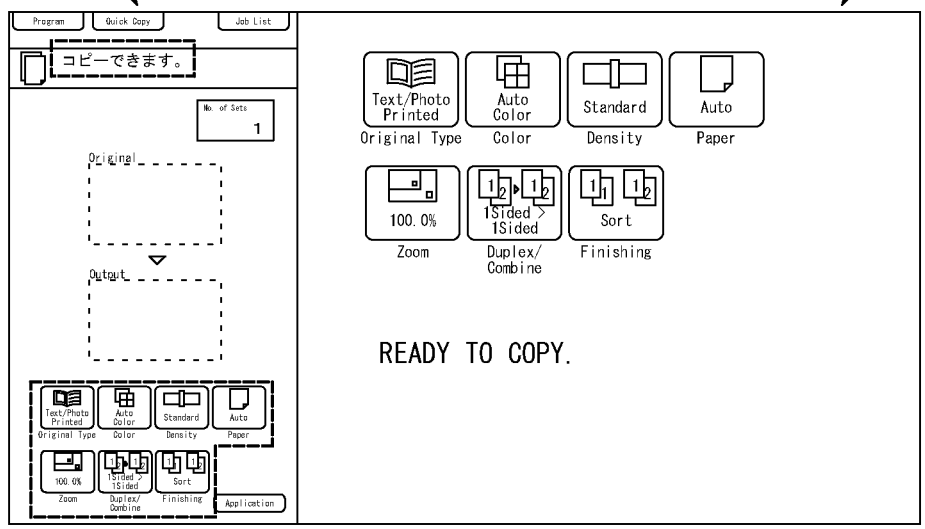

DISPLAY DEVICE, IMAGE PROCESSING DEVICE AND NON-TRANSITORY RECORDING MEDIUM

Japanese patent application No. 2018-001126 filed on Jan. 9, 2018 including description, claims, drawings, and abstract the entire disclosure is incorporated herein by reference in its entirety.

BACKGROUND

Technological Field

The present invention relates to a display device, an image processing device and a non-transitory recording medium. The present invention more specifically relates to a technique for controlling a display screen corresponding to an attitude of the display device.

Description of the Related Art

Image processing devices such as MFPs (Multifunction Peripherals) are provided with respective touch panel type display devices. The display device is provided as an operational panel of the image processing device, and serves as a user interface for a user to use the image processing device. To be more specific, the display device displays a variety of operation screens operable for the user, and receives a user operation performed to the operation screen. This type of the display device generally has a rectangular display area.

Among the aforementioned type of the image processing devices, one that enables the user to sequentially change an attitude (orientation) of the display device has recently been known. This known technique is introduced for example in Japanese Patent Application Laid-Open No. JP 2013-140504 A. According to the known technique, when the user rotates the display device, the orientation of the display device may be changed between a first attitude (a first orientation) and a second attitude (a second orientation). The display device is in the first orientation when a longitudinal direction of the rectangular display area is in a right and left direction (landscape direction), and it is in the second orientation when the longitudinal direction of the display device is in an upper/lower direction (portrait direction). In response to changing the orientation from the first orientation to the second orientation, the display device rotates a part of an image which was displayed while the device was in the first orientation, and enlarges the part of the image and displays the enlarged image. The display device is then enabled to display a screen corresponding to the second orientation. To be more specific, according to the known technique, when the display device is in the first orientation, multiple contents are displayed in the screen. Once the display device's orientation changes to the second orientation from the first orientation, only a part of the multiple contents are enlarged and the enlarged contents are displayed on a whole surface of the display device.

According to the known technique, a part of the contents which had been displayed prior to the rotation of the display device is not displayed after the rotation. The user is required to return the display device to the original attitude in order to check the contents not being displayed due to the rotation of the display device. Operation buttons for the user to operate may not be displayed due to the rotation. Especially in such a case, the user cannot perform his or her intended operation to the display device which is being rotated. The user needs to return the display device to the original attitude in order to perform the intended operation, resulting in degradation of operability.

SUMMARY

The present invention is intended to solve the above problems. Thus, the present invention is intended to provide a display device, an image processing device and a non-transitory recording medium capable of displaying a screen having a high usability without causing degradation of operability even if there is a change in a display device's attitude.

First, the present invention is directed to a display device, with a display part having a rectangular display area, capable of changing an orientation of said display part between a first orientation and a second orientation rotated by 90 degrees from said first orientation.

To achieve at least one of the abovementioned objects, according to an aspect of the present invention, the display device reflecting one aspect of the present invention comprises: a hardware processor that: detects whether the orientation of said display part is either said first orientation or said second orientation; displays a first screen on which an operation screen operable for a user is arranged on a whole surface of said display area on said display part when the orientation of said display part is said first orientation; and displays a second screen on which reduced said operation screen is arranged in a part of said display area and a content included in said operation screen is arranged in a remaining part of said display area on said display part when the orientation of said display part is said second orientation.

Second, the present invention is directed to animage processing device, with a display part having a rectangular display area, capable of changing an orientation of said display part between a first orientation and a second orientation rotated by 90 degrees from said first orientation.

To achieve at least one of the abovementioned objects, according to an aspect of the present invention, the image processing device reflecting one aspect of the present invention comprises: a hardware processor that: detects whether the orientation of said display part is either said first orientation or said second orientation; displays a first screen on which an operation screen operable for a user is arranged on a whole surface of said display area on said display part when the orientation of said display part is said first orientation; displays a second screen on which reduced said operation screen is arranged in a part of said display area and a content included in said operation screen is arranged in a remaining part of said display area on said display part when the orientation of said display part is said second orientation; and controls processing of a job based on user operation to said operation screen which is displayed on the whole surface of said display area while said first screen is being displayed, and controls the processing of the job based on the user operation to said operation screen reduced and displayed in the part of said display area or to the content displayed in the remaining part of said display area while said second screen is being displayed.

Third, the present invention is directed to a non-transitory recording medium storing a computer readable program to be executed by a hardware processor in a display device, with a display part having a rectangular display area, capable of changing an orientation of said display part between a first orientation and a second orientation rotated by 90 degrees from said first orientation.

To achieve at least one of the abovementioned objects, according to an aspect of the present invention, the non-transitory recording medium reflecting one aspect of the present invention stores the computer readable program, execution of the computer readable program by the hardware processor in the display device causing the hardware processor to perform: detects whether the orientation of said display part is either said first orientation or said second orientation; displays a first screen on which an operation screen operable for a user is arranged on a whole surface of said display area on said display part when the orientation of said display part is said first orientation; and displays a second screen on which reduced said operation screen is arranged in a part of said display area and a content included in said operation screen is arranged in a remaining part of said display area on said display part when the orientation of said display part is said second orientation.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

FIG. 5 illustrates an example of content registration information;

FIGS. 6A and 6B illustrate examples of a first screen and a second screen displayed on a display unit;

FIGS. 13A and 13B illustrate an example of the screens when an orientation that enables a longitudinal direction of the display unit to be in an upper/lower direction (portrait direction) is a basic attitude (first orientation).

DETAILED DESCRIPTION OF EMBODIMENTS

Hereinafter, one or more embodiments of the present invention will be described with reference to the drawings. However, the scope of the invention is not limited to the disclosed embodiments.

First Preferred Embodiment

Figure 1A:
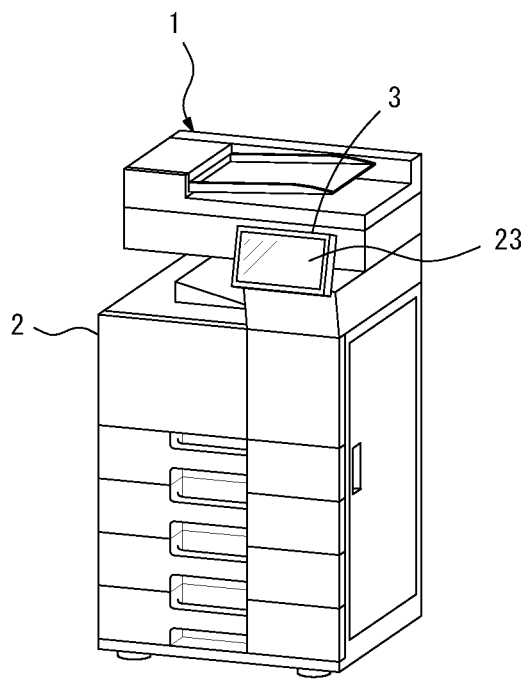
FIGS. 1A and 1B each of which illustrates an exemplary appearance structure of an image processing device.
Figure 1B:
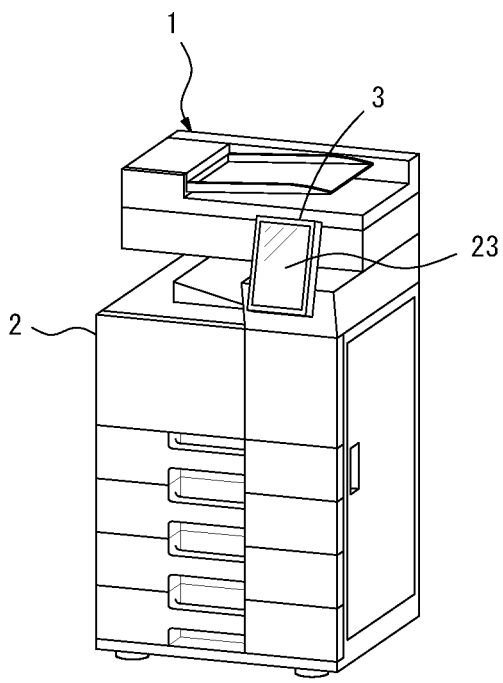

The first preferred embodiment of the present invention is explained at first. FIGS. 1A and 1B each of which illustrates an exemplary appearance structure of an image processing device 1. The image processing device 1 may be one of MFPs including multiple functions such as a copy function, a scan function, a print function and/or a fax function, for instance. The image processing device 1 includes a device body 2 and a display device 3. The device body 2 activates one or more functions selected by a user from among the multiple functions to process a job. The display device 3 is provided at a front side of the device body 2.

The display device 3 is provided as an operational panel for the user to operate the image processing device 1. The display device 3 displays various types of operation screens operable for the user and receives operations performed by the user. The display device 3 is enabled to perform wired or wireless communications with the device body 2, for example. The display device 3 displays the operation screen to operate the device body 2. In response to receiving the user operation, the display device 3 sends operation information based on the operation to the device body 2. As a result, the display device 3 is enabled to bring the device body 2 into operation in response to the user operation.

The display device 3 includes a display unit 23 with a rectangular display area. The display device 3 is rotatably hold by the device body 2. The display device 3 may at least be rotated by 90 degrees. Hence, an attitude of the display device 3 may be changed between a first attitude (a first orientation) and a second attitude (a second orientation). The display device 3 is in the first orientation when a longitudinal direction of the display unit 23 is in a right and left direction (landscape direction) as illustrated in FIG. 1A, and it is in the second orientation when the longitudinal direction of the display unit 23 is in an upper/lower direction (portrait direction) as illustrated in FIG. 1B. More specifically, the display device 3 changes its attitude between the first orientation and the second orientation in response to rotation by 90 degrees.

The display device 3 may be detachable from the device body 2. When the display device 3 is detachable from the device body 2, the user detaches the display device 3 from the device body 2 and rotates the detached display device 3. The user then is enabled to change the orientation of the display device 3 between the first orientation and the second orientation.

The display device 3 switches a display manner of the operation screen displayed on the display unit 23 depending on the orientation, the first orientation of FIG. 1A or the second orientation of FIG. 1B. The operation screen designed in advance that enables the full-screen display on the display unit 23 when the display device 3 is in either the first orientation or the second orientation is stored in the display device 3. When the attitude is changed in response to the user rotation operation, the display device 3 automatically creates the screen to display after the change in the attitude based on the operation screen. As an example, the display device 3 of the first preferred embodiment sets the first orientation of FIG. 1A as a basic attitude. The operation screen designed in advance that enables the full-screen display on the display unit 23 when the display device 3 is in the first orientation is stored in the display device 3. The attitude of the display device 3 may be changed from the first orientation to the second orientation in response to the user rotation operation. The display device 3 then processes the operation screen that is displayed on a whole surface of the display unit 23 while the display device 3 is in the first orientation to automatically create the screen suitable for the display in the second orientation. The detail is described below.

Figure 2:
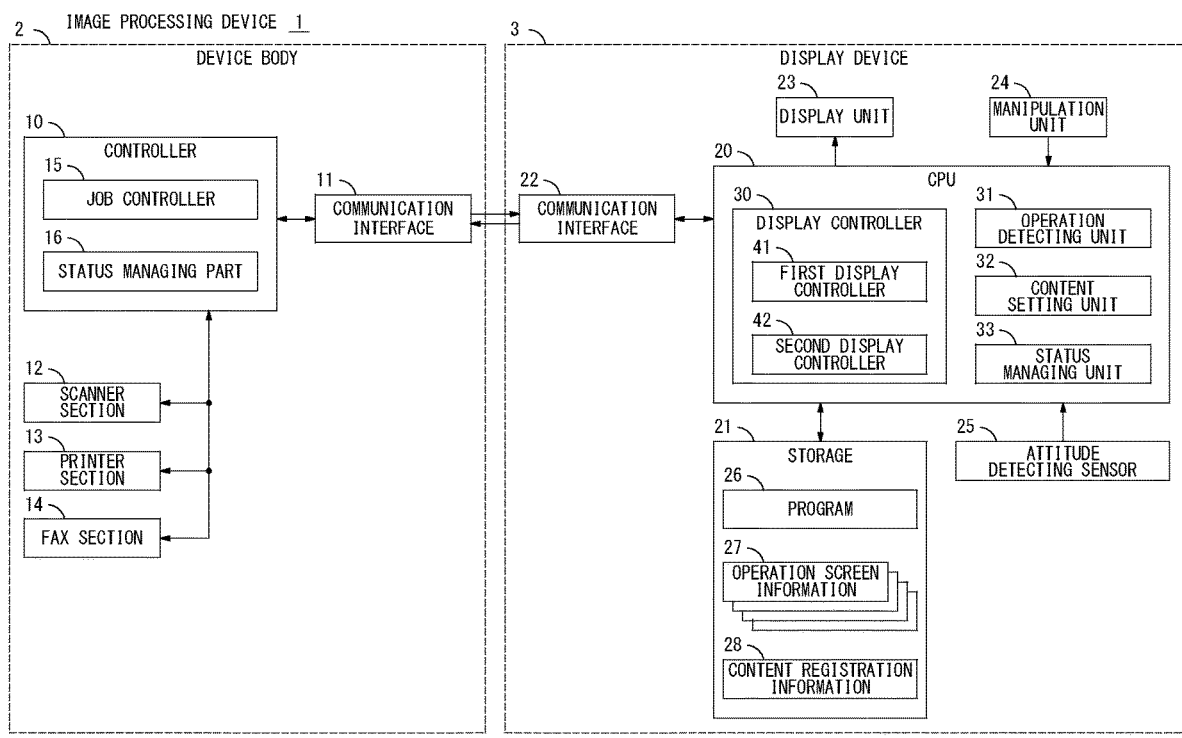
FIG. 2 illustrates a block diagram showing an example of a hardware structure and a functional structure of the image processing device.

FIG. 2 illustrates a block diagram showing an example of a hardware structure and a functional structure of the image processing device 1. As illustrated in FIG. 2, the device body 2 and the display device 3 are connected to each other so that communications there between are enabled.

As the hardware structure, the device body 2 includes a controller 10, a communication interface 11, a scanner section 12, a printer section 13 and a fax section 14. The controller 10 controls operations of each part of the device body 2. The controller 10 includes a CPU and a memory which are not shown in FIG. 2. The CPU executes a predetermined program so that the controller 10 serves as a job controller 15 and a status managing part 16.

The job controller 15 performs a variety of processes relating to the job based on the operation information received from the display device 3. The operation information may be relating to an instruction on job settings, for instance. The job controller 15 then applies the job settings based on the operation information. The operation information may be relating to an instruction to start processing of the job, for instance. The job controller 15 then brings at least one of the scanner section 12, the printer section 13 and the fax section 14 to control the processing of the job.

The job controller 15 is enabled to output a variety of information to the display device 3. The job controller 15 is, for example, capable of outputting image data obtained in response to the processing of the job to the display device 3, and enabling the display device 3 to display a preview image based on the image data.

The status managing part 16 manages whether a status of the image processing device 1 is either a normal status or an abnormal status. When no abnormality occurs in the image processing device 1, the image processing device 1 is in the normal status. On the other hand, any kind of abnormality such as a paper jam, a toner empty or a paper empty may be detected in the device body 2. In such a case, the status of the image processing device 1 is switched to the abnormal status from the normal status. The status managing part 16 outputs the current status of the image processing device 1 to the display device 3 via the communication interface 11.

The communication interface 11 is to perform wired or wireless one-to-one communication with the display device 3. The controller 10 sends various types of information to the display device 3 and receives information from the display device 3 via the communication interface 11. The communication interface 11 may switch the communication manner between the display device 3 and the device body 2 to either the wired or wireless communication depending on whether or not the display device 3 is attached to the device body 2. The communication interface 11 may, for example, perform wired communication with the display device 3 when the display device 3 is attached to the device body 2, and the communication interface 30 may perform wireless communication with the display device 3 when the display device 3 is detached from the device body 2.

The scanner section 12 becomes operative when the copy job or the scan job is processed. The scanner section 12 optically reads an image of a document placed by the user and generates image data. After generating the image data, the scanner section 12 outputs the generated image data to the job controller 15. The scanner section 12 may include an automatic document feeder (ADF). Once a paper jam of the document occurs during automatic document feeding, the scanner section 12 with the automatic document feeder notifies the status managing part 16 of the occurrence of the abnormality.

The printer section 13 becomes operative when the copy job or the print job is processed. The printer section 13 produces a printed output based on the image data received from the job controller 15. When any kind of abnormality such as a paper jam, a toner empty or a paper empty occurs during the processing of the job, the printer section 13 notifies the status managing part 15 of the occurrence of the abnormality.

The fax section 14 transmits and receives fax data over public phone lines. The fax section 14 converts the image data received from the job controller 15 into fax data, and sends the fax data to a designated address. In response to receiving the fax data over the public phone line, the fax section 14 converts the received fax data into image data and outputs to the job controller 15.

As the hardware structure, the display device 3 includes a CPU 20, a storage 21, a communication interface 22, a display unit 23, a manipulation unit 24 and an attitude detecting sensor 25.

The CPU 20 is a hardware processor that executes a program so that it controls operations of each part. Once the displayed device 3 is powered, the CPU 20 reads and executes a program 26 stored in the storage 21. The CPU 20 then serves as a display controller 30, an operation detecting unit 31, a content setting unit 32 and a status managing unit 33.

The storage 21 is a non-volatile storage device formed from a device such as a SSD (solid state drive) which is one kind of a computer readable recording medium. The aforementioned program 26 is stored in advance in the storage 21. Operation screen information 27 is also stored in the storage 21. The variety of operation screens to display on the display unit 23 are stored as the operation screen information 27. Moreover, content registration information 28 is stored in advance in the storage 21. The details of the operation screen information 27 and the content registration information 28 are explained later.

The communication interface 22 is to perform one-to-one wired or wireless communication with the device body 2. The CPU 20 obtains the various types of information from the device body 2 and sends the various types of information including the operation information to the device body 2 via the communication interface 22. The communication interface 22 may switch the communication manner between the display device 3 and the device body 2 to either the wired or wireless communication depending on whether or not the display device 3 is attached to the device body 2. The communication interface 22 may, for example, perform wired communication with the device body 2 when the display device 3 is attached to the device body 2, and may perform wireless communication with the device body 2 when the display device 3 is detached from the device body 2.

The display unit 23 constructed by a device such as a color liquid crystal display, for instance, displays the variety of operation screens to the user who is using the image processing device 1. The display unit 23 has the rectangular display area as described earlier. The display unit 23 is capable of displaying the single operation screen on a whole surface of its display area. The display unit 23 is also capable of dividing the rectangular display area into multiple areas and displaying different images in the respective areas. The display unit 23 displays the screen received from the CPU 20 in the display area so that the variety of operation screens operable for the user may be displayed. An aspect ratio of the display unit 23 of the first preferred embodiment is 16:9 as an example. The aspect ratio of the display unit 23 does not always have to be 16:9.

The manipulation unit 24 receives the user operation. The manipulation unit 24 may be constructed by touch panel keys, for instance, arranged on the display area of the display unit 23. The manipulation unit 24 may include push button keys arranged around the display area besides the touch panel keys. In response to detecting the user operation, the manipulation unit 24 outputs information showing an operated position to the CPU 20.

The attitude detecting sensor 25 detects the attitude of the display device 3. To be more specific, the attitude detecting sensor 25 is capable of detecting whether the display device 3 is in either the first attitude (first orientation) or the second attitude (second orientation). The attitude detecting sensor 25 is constructed to always detect the attitude of the display device 3. The attitude detecting sensor 25 outputs the current attitude of the display device 3 to the CPU 20.

The display controller 30 controls the screen to display on the display unit 23. The display controller 30 controls the display manner of the operation screen to display on the display unit 23 based on the current attitude of the display device 3 detected by the attitude detecting sensor 25. The display controller 30 includes a first display controller 41 and a second display controller 42.

The first display controller 41 becomes operative when the display device 3 is in the first attitude (first orientation). The first display controller 41 reads the operation screen to display on the display unit 23 in the operation screen information 27 in the storage 21. The first display controller 41 then displays a first screen on which the operation screen is arranged over the entire surface of the display area of the display unit 23.

Figure 3:
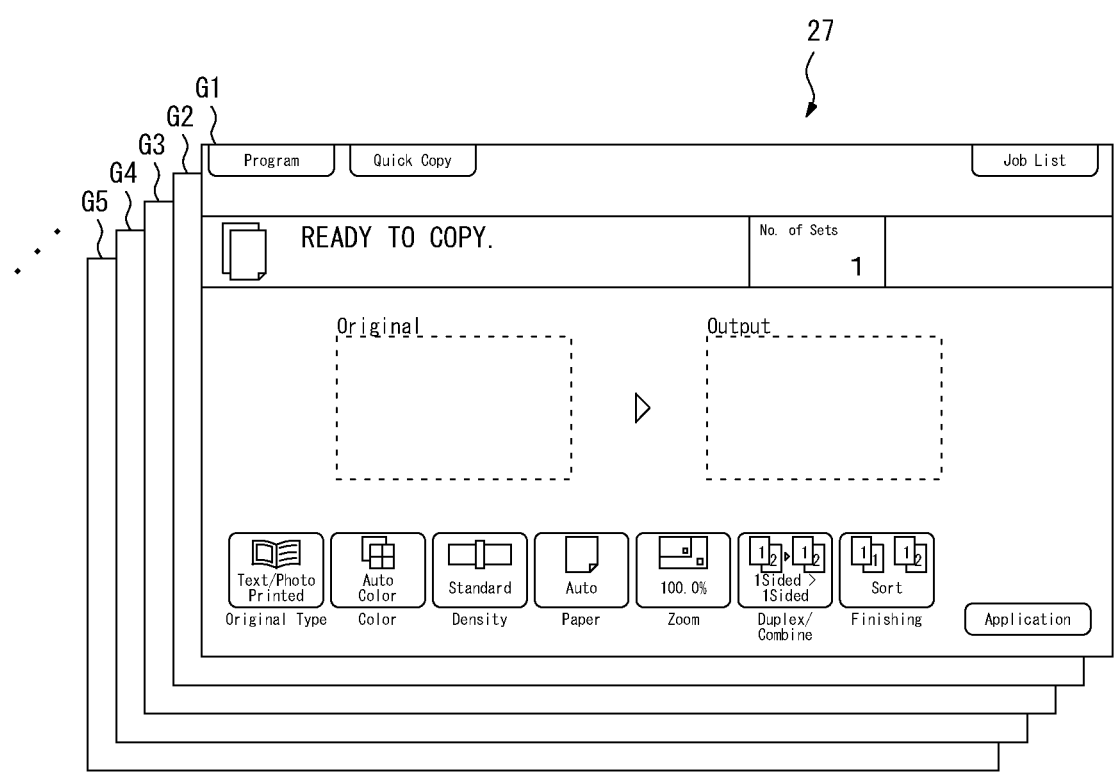
FIG. 3 illustrates an example of operation screen information.

FIG. 3 illustrates an example of the operation screen information 27 stored in the storage 21. Multiple operation screens G1, G2 and G3 . . . those may be displayed on the whole surface of the display unit 23 when the display device 3 is in the first attitude (the first orientation) are stored as the operation screen information 27. More specifically, the aspect ratio of each of the operation screens G1, G2 and G3 . . . stored as the operation screen information 27 is 16:9. The operation screen G1, for instance, is the screen for the user to configure a variety of settings relating to the copy function when he or she selects the copy function. Besides the operation screen G1, various types of operation screens are stored as the operation screen information 27.

Figure 4A:
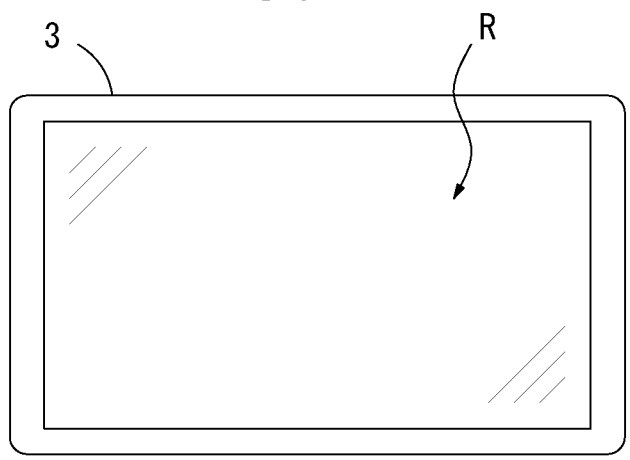
FIGS. 4A and 4B illustrate respective examples when a display device is in a first orientation and a second orientation.
Figure 4B:
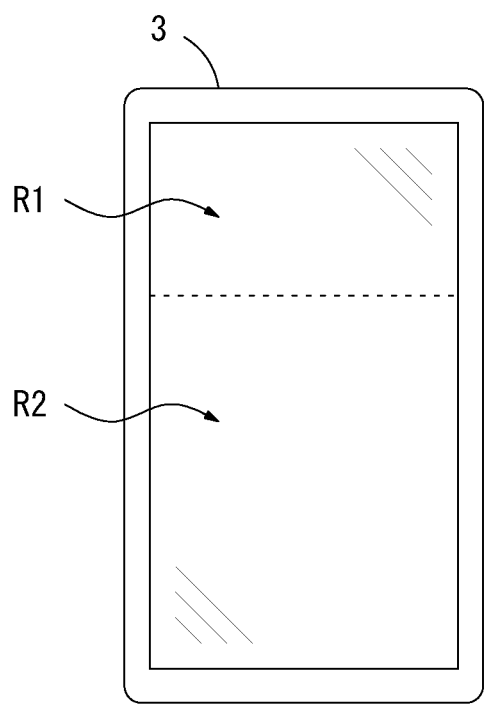

FIGS. 4A and 4B illustrate respective examples when the display device is in the first orientation and the second orientation. As illustrated in FIG. 4A, the display device 3 may be in the first orientation. In this case, the aspect ratio of the display area of the display unit 23 is 16:9. The first display controller 41 arranges the operation screen read from the operation screen information 27 as it is on the whole surface of an area R which is an entire surface of the display area so that it may display the operation screen which is created in advance to have the aspect ratio 16:9 on the whole surface of the display unit 23. Consequently, the first screen displayed on the display unit 23 while the display device 3 is in the first orientation may be the screen showing one of the operation screens G1, G2 and G3 . . . stored as the operation screen information 27 as it is on the whole surface.

The second display controller 42 becomes operative when the display device 3 is in the second attitude (second orientation). The second display controller 42 reads the operation screen to display on the display unit 23 from the operation screen information 27 in the storage 21. The second display controller 42 then reduces the read operation screen and arranges the reduced operation screen in a part of the display area of the display unit 23. The second display controller 42 also arranges a content included in the operation screen in a remaining part of the display area, thereby creating a second screen. The second display controller 42 then displays the created second screen on the display unit 23.

To be more specific, as illustrated in FIG. 4B, when the display device 3 is in the second orientation, the aspect ratio of the display area of the display unit 23 is 9:16. The second display controller 42 divides the display area of the display unit 23 into two areas, a part of the display area R1 and a remaining display area R2. The aspect ratio of the part of the display area R1 is 16:9. The part of the display area R1 is in an upper part of the display unit 23 which is in the second orientation, for example. The remaining display area R2 is an area excluding the part of the display area R1. The second display controller 42 reduces the operation screen read from the operation screen information 27 and arranges the reduced operation screen in the part of the display area R1. The second display controller 42 also arranges a content included in the operation screen in the remaining display area R2. The second display controller 42 thereby creates a second screen including the part of the display area R1 and the remaining display area R2. It is preferable for the second display controller 42 to arrange the content to display in the remaining display area R2 without making it reduced. Hence, the second screen displayed on the display unit 23 while the display device 3 is in the second orientation includes the part of the display area R1 in which one of the reduced operation screens G1, G2 and G3 . . . stored as the operation screen information 27 is displayed and the remaining display area R2 in which the content included in the one of the reduced operation screens G1, G2 and G3 . . . is displayed.

In arranging the content included in the operation screen in the remaining display area R2, the second display controller 42 extracts the content to display in the remaining display area R2 from among the multiple contents included in the operation screen based on the content registration information 28. In detail, the second display controller 42 does not arrange all of the multiple contents included in the operation screen in the remaining display area R2. The second display controller 42 extracts only the content registered in advance with the content registration information 28 as the content to be arranged in the remaining display area R2. All of the contents included in the operation screen may be registered in advance with the content registration information 28 as the content to be arranged in the remaining display area R2. In such a case, the second display controller 42 extracts all of the contents included in the operation screen as the content to be arranged in the remaining display area R2. The second display controller 42 arranges the content extracted based on the content registration information 28 in the remaining display area R2, and creates the second screen.

FIG. 5 illustrates an example of the content registration information 28. As illustrated FIG. 5, the content registration information 28 includes an item of the operation screen 28a, an item of the content 28b, an item of display position 28c, an item of the extract display setting 28d, and an item of priority 28e corresponding to each other. All of the operation screens that may be displayed on the display unit 23 are registered as the item of the operation screen 28a. All of the contents included in each operation screen are registered as the item of the content 28b. More specifically, each operation screen includes a variety of contents such as a character string forming a message to the user, an operation button operable for the user and a preview area to display a preview image. All of the multiple contents included in the single operation screen are registered in advance as the item of the content 28b. Information relating to a display position of each content in the operation screen is registered as the item of display position 28c. By referring to the item of display position 28c, each content is included in what position in the operation screen may be figured out.

The content that should be arranged in the remaining display area R2 of the multiple contents included in the operation screen when the display device 3 is made in the second orientation is registered as the item of the extract display setting 28d. More specifically, the content showing "ON" in the item of the extract display setting 28d is the one should be arranged in the remaining display area R2 when the display device 3 is made in the second orientation. In contrast, the content showing "OFF" in the item of the extract display setting 28d is not the one should be arranged in the remaining display area R2 even when the display device 3 is made in the second orientation.

Priority of the content that shows "ON" in the item of the extract display setting 28d is registered as the item of priority 28e. In the example of FIG. 5, the priority has two levels "HIGH" and "LOW." The levels that the priority has may not always be two. The priority may have more than three levels.

The second display controller 42 extracts the content to arrange in the remaining display area R2 from the operation screen based on the item of the extract display setting 28d corresponding to the operation screen to display on the display unit 23. The second display controller 42 further arranges the extracted content in the remaining display area R2 based on the item of priority 28e, so that it may create the second screen. The second display controller 42 outputs and displays the second screen on the display unit 23 which is in the second orientation.

The operation detecting unit 31 detects the user operation based on the information received from the manipulation unit 24. As described above, once detecting the user operation, the manipulation unit 24 outputs the information showing the operated position in response to the user operation to the CPU 20. The operation detecting unit 31 obtains the information showing the operated position so that it may figure out the operation is performed by the user. The operation detecting unit 31 identifies what operation is performed by the user based on the operated position of the user operation, and processes processing in response to the identified operation. It is assumed, for example, that the operation performed by the user is the operation to update the operation screen. In this case, the operation detecting unit 31 gives an instruction to the display controller 30 to update the operation screen. The operation performed by the user may be the operation to configure settings or to give an instruction on job processing. In this case, the operation detecting unit 31 sends the instruction on job settings or job processing to a device body 2 via the communication interface 22.

The content setting unit 32 is to change the settings of the item of the extract display setting 28d and the item of priority 28e in response to the user setting operation. The content setting unit 32 becomes operative when the user selects an edition of the content registration information 28, for example. The content setting unit 32 displays the screen to change the settings of the content registration information 28 on the display unit 23 via the display controller 30. Once the settings change screen appears on the display unit 23, the user is allowed to edit the extract display setting 28d and the item of priority 28e in the content registration information 28. To be more specific, the user may add or delete the content to be displayed in the remaining display area R2 when the display device 3 is in the second orientation. The user is also allowed to change the priority of the content to be displayed in the remaining display area R2. The content setting unit 32 updates the content registration information 28 in response to the user operation.

The status managing unit 33 manages a status of the image processing device 1 received from the status managing part 16 of the device body 2. In detail, the status managing unit 33 manages whether the status of the image processing device 1 is a normal status or an abnormal status in real-time. Hence, when any kind of error such as the paper jam, the toner empty or the paper empty is detected in the device body 2, the status managing unit 33 may detect that the image processing device 1 is in the abnormal status.

Next, an example of the screen control by the display controller 30 is explained. FIGS. 6A and 6B illustrate examples of a first screen 100 and a second screen 200 displayed on the display unit 23. FIG. 6A illustrates the first screen 100 displayed when the display device 3 is in the first orientation, and FIG. 6B illustrates the second screen 200 displayed when the display device 3 is in the second orientation.

When the display device 3 is in the first orientation, the first display controller 41 of the display controller 30 becomes operative as described above. The first display controller 41 reads the operation screen G1 to display on the display unit 23 from the operation screen information 27. The first display controller 41 then arranges and displays the operation screen on the whole surface of the display area of the display unit 23. Consequently, the first screen 100 which shows the operation screen G1 on the whole surface is displayed on the display unit 23 as illustrated in FIG. 6A when the display device 3 is in the first orientation. The operation screen G1 of FIG. 6A includes, for instance, character strings 101 forming a message to the user, multiple operation buttons 102 operable for the user, and an image display area 103 to show with an image how a document is output based on the settings configured by the user as the contents.

The attitude of the display device 3 may be changed from the first orientation to the second orientation. The second display controller 42 of the display controller 30 becomes operative then. The second display controller 42 obtains the operation screen G1 displayed by the first display controller 41. The second display controller 42 reduces the operation screen G1 and arranges the reduced operation screen G1 in the part of the display area R1 of the display unit 23. The second display controller 42 extracts the content to display in the remaining display area R2 from among the multiple contents included in the operation screen G1 based on the content registration information 28. More specifically, the second display controller 42 refers to the item of the extract display setting 28d corresponding to the operation screen G1 in the content registration information 28, and extracts all of the contents showing "ON." The second display controller 42 arranges the content extracted from the operation screen G1 in the remaining display area R2 based on the item of priority 28e. The second display controller 42 arranges the contents in the order of descending priorities in the remaining display area R2 from the upper part. As a result, the second screen 200 as illustrated in FIG. 6B is created. In the example of FIG. 6B, the operation buttons 102 and the character strings 101 included in the operation screen G1 are extracted and arranged in the remaining display area R2. In the example of FIG. 6B, the priority of the operation buttons 102 is higher than that of the character string 101.

When arranging the content included in the operation screen G1 in the remaining display area R2, the second display controller 42 arranges the content in a size equal to or larger than a size of the content displayed on the first screen 100. In detail, the second display controller 42 may arrange the content extracted from the operation screen G1 in the same size as being displayed on the first screen 100, or may enlarge and display the content. Thus, visibility and operability of the content arranged in the remaining display area R2 may be ensured.

When arranging the content included in the operation screen G1 in the remaining display area R2, the second display controller 42 refers to the item of display position 28c in the content registration information 28 and identifies the displayed position of each content in the operation screen G1. A frame image 210 is arranged in a position where the content arranged in the remaining display area R2 is included on the operation screen G1 which is reduced and arranged in the part of the display area R1. The frame image 210 is an indicator indicating the user that the content arranged in the remaining display area R2 corresponds to what content of the multiple contents included in the reduced and displayed operation screen G1. The user checks the frame image 210 so that he or she may figure out the content displayed in the remaining display area R2 can be found in what position of the reduced operation screen G1.

When the display device 3 is in the second orientation, the second screen 200 as illustrated in FIG. 6B is displayed on the display unit 23. The user then may see the whole screen of the operation screen G1. The user also may perform the job settings operation by operating the operation buttons 102 displayed in the remaining display area R2. Hence, the change in the attitude of the display device 3 does not cause degradation of the operability of the operation screen G1 and enables to display the user-friendly screen.

While the second screen 200 as illustrated in FIG. 6B is displayed, the operation detecting unit 31 may detect not only the operation to the operation buttons 102 displayed in the remaining display area R2 but also the operation to the reduced operation screen G1. The user may perform the operation to both of the part of the display area R1 and the remaining display area R2 on the second screen 200 so this makes the second screen the user-friendly screen.

When the status of the image processing device 1 managed by the status managing unit 33 is the normal status, the second display controller 42 displays each content in the remaining display area R2 based on the item of priority 28e in the content registration information 28. The priorities of the multiple contents designated as the target of display in the remaining display area R2 may be the same in accordance with the content registration information 28. Even in such a case, the second display controller 42 displays the operation buttons 102 operable for the user in the remaining display area R2 more preferentially than the other contents. As a result, the operability of the operation buttons 102 may be improved.

When the status of the image processing device 1 managed by the status managing unit 33 is the abnormal status, the second display controller 42 most preferentially arranges the character string forming the massage notifying the abnormal status in the remaining display area R2 regardless of the item of priority 28e in the content registration information 28. If the image processing device 1 is in the abnormal status while the display device 3 is in the second orientation, the display of the character string may effectively notify the user of the occurrence of the abnormal status.

Figure 7A:
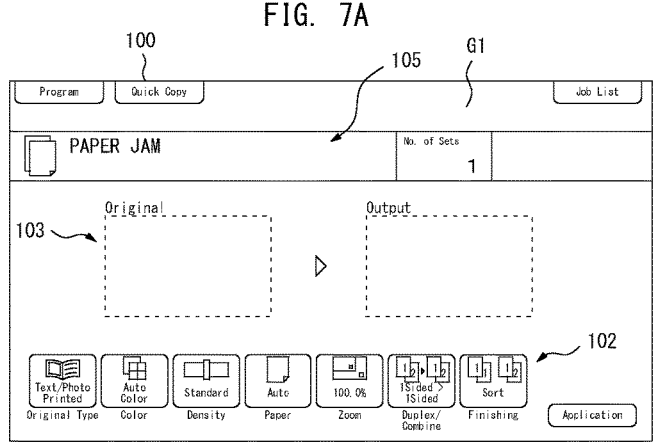
FIGS. 7A and 7B illustrate examples of the first screen and the second screen displayed on the display unit when the image processing device is in an abnormal status.
Figure 7B:
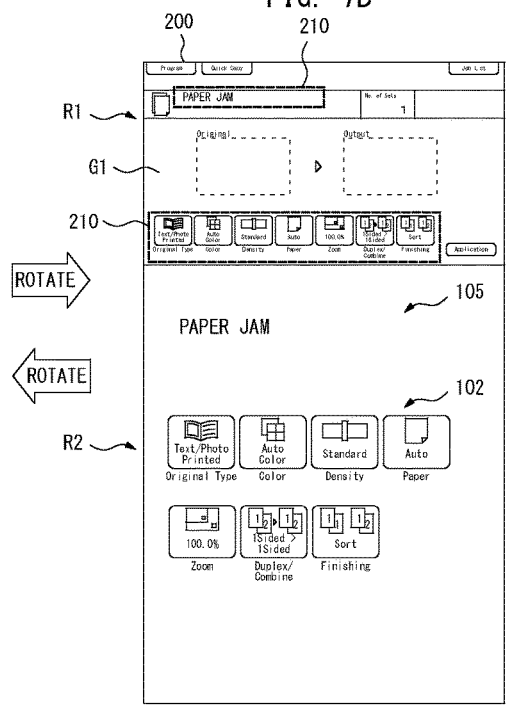

FIGS. 7A and 7B illustrate examples of the first screen and the second screen displayed on the display unit 23 when the image processing device 1 is in the abnormal status. FIG. 7A illustrates an example of the first screen 100 displayed when the display device 3 is in the first orientation, and FIG. 7B illustrates an example of the second screen 200 displayed when the display device 3 is in the second orientation.

When the display device 3 is in the first orientation as illustrated in FIG. 7A, the first screen 100 is displayed on the display unit 23. Since the image processing device 1 is in the abnormal status, a character string 105 indicating the abnormal status appears on the first screen 100. In the examples of FIGS. 7A and 7B, it is assumed that the paper jam is occurred in the image processing device 1. Even when the occurrence of another kind of error such as the toner empty or the paper empty, the same character string 105 indicating the occurrence of the abnormal status appears.

When the display device 3 is in the second orientation as illustrated in FIG. 7B, the second display controller 42 creates the second screen 200 as the same as above. Since the image processing device 1 is in the abnormal status, the second display controller 41 most preferentially arranges the character string 105 indicating the abnormal status from among the multiple contents included in the operation screen G1 in the remaining display area R2. Hence, the operation buttons 102 operable for the user are arranged in the lower-priority position than the character string 105. The second screen 200 of FIG. 7B is then created and displayed on the display unit 23. On the second screen 200 of FIG. 7B, the character string indicating the occurrence of the abnormal status is displayed in the remaining display area R2 without being reduced so the user may find out that the image processing device 1 is in the abnormal status.

Figure 8A:
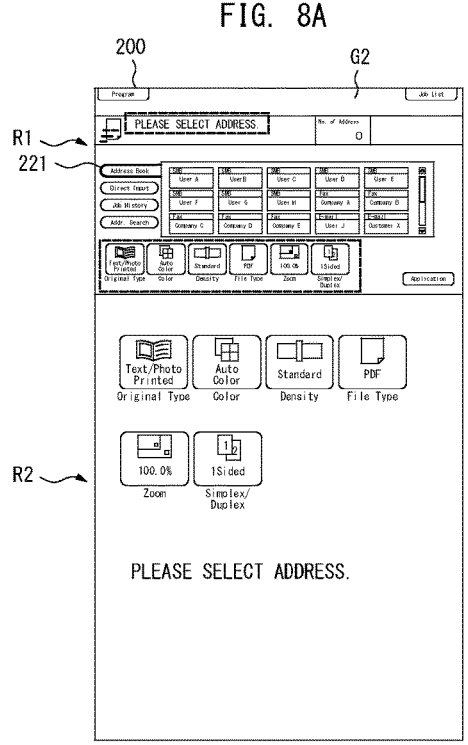
FIGS. 8A and 8B illustrate an example of update of the second screen by a second display controller.
Figure 8B:
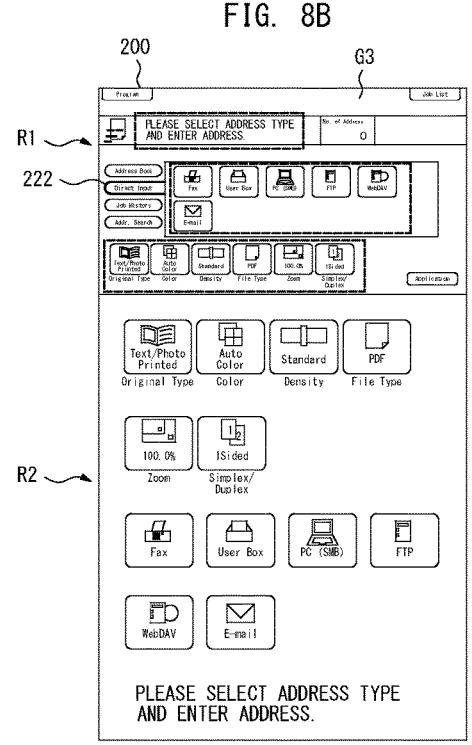

For updating the operation screen in the part of the display area R1 while the second screen 200 is being displayed on the display unit 23, the second display controller 42 creates the new second screen 200 based on the updated operation screen and updates the second screen 200 displayed on the display unit 23. FIGS. 8A and 8B illustrate an example of the update of the second screen 200 by the second display controller 42. FIG. 8A illustrates the second screen 200 based on the operation screen G2. The operation screen G2 is an example of an address selection screen when the scan function is selected by the user. A tab 221 to select a destination of the image data from an address book registered in advance with the image processing device 1 on the operation screen G2 has been selected from among multiple tags selectable for the user. The operation screen G2 is reduced and displayed in the part of the display area R1 of the display unit 23. On the other hand, the operation buttons operable for the user and the character strings forming the message to the user are displayed in the remaining display area R2 of the display unit 23 as illustrated in FIG. 8A.

While the second screen 200 as illustrated in FIG. 8A is displayed, the user may select a tab 222 on the operation screen G2. The second display controller 42 then switches the second screen 200 of FIG. 8A to the second screen 200 of FIG. 8B. To be more specific, on the second screen 200 of FIG. 8B, the operation screen G3 showing that the tab 222 being selected is displayed in the part of the display area R1 and the contents included in the operation screen G3 are displayed in the remaining display area R2. The second display controller 42 extracts the content included in the operation screen G3 based on the item of the extract display setting 28d and the item of priority 28e corresponding to the operation screen G3 in the content registration information 28, and arranges the extracted content in the remaining display area R2 as well as described above.

The user may select again the tab 221 while the second screen 200 based on the operation screen G3 is displayed. The second display controller 42 then returns to the second screen 200 of FIG. 8A from the second screen 200 of FIG. 8B. As described above, in order to update the operation screen while displaying the second screen 200 on the display unit 23, the second display controller 42 creates the second screen 200 corresponding to the updated operation screen based on the content registration information 28 corresponding to the updated operation screen, and updates the second screen 200 to display on the display unit 23. More specifically, even when the display device 3 is in the second orientation, the second screen 200 may be updated in response to the user operation. The user is allowed to continue the operation without putting the attitude of the display device 3 back to the first orientation, resulting in high operability.

Figure 9A:
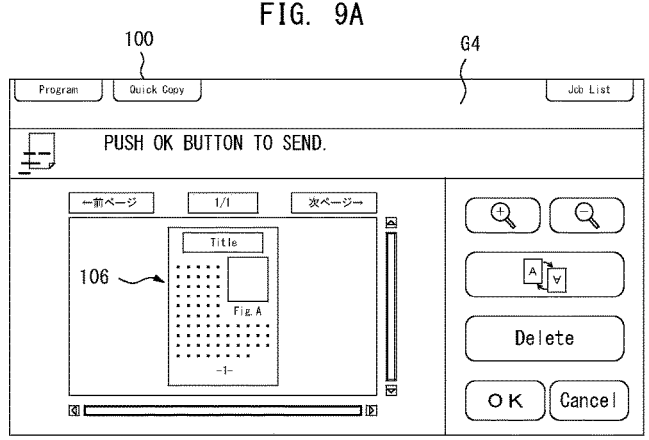
FIGS. 9A and 9B illustrate an example of the first screen and the second screen when an operation screen including a preview image is displayed.
Figure 9B:
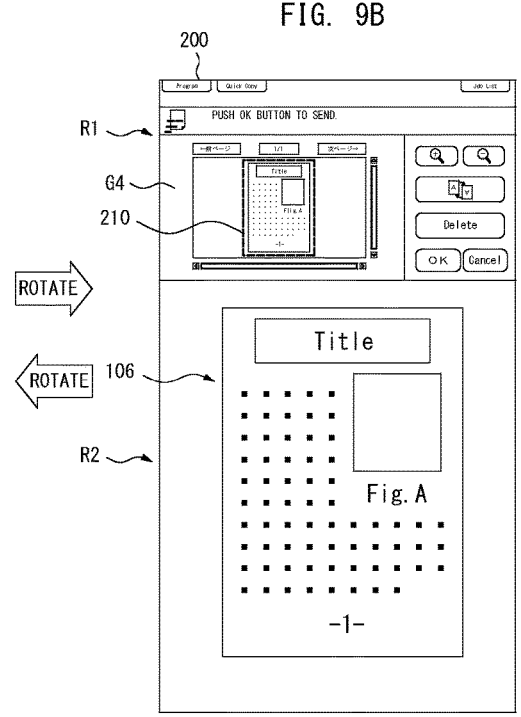

Next, an example where the operation screen includes a preview image is explained. FIGS. 9A and 9B illustrate an example of the first screen 100 and the second screen 200 when the operation screen G4 including a preview image 106 is displayed. FIG. 9A illustrates the first screen 100 displayed when the display device 3 is in the first orientation, and FIG. 9B illustrates the second screen 200 displayed when the display device 3 is in the second orientation.

When the display device 3 is in the first orientation, the operation screen G4 including the preview image 106 is displayed on the whole surface of the first screen 100. The preview image 106 is based on the image data generated by reading the document with the scan function, for instance. However, this is given not for limitation. The preview image 106 may be the image based on the image data obtained as a target of the print job, for instance. When the operation screen G4 is displayed on the whole surface of the first screen 100 as illustrated in FIG. 9A, it is easier for the user to see the preview image 106. Once the display device 3 is put into the second orientation, the operation screen G4 is reduced and the reduced operation screen G4 is arranged in the part of the display area R1 of the display unit 23. This makes the user difficult to see the preview image 106 in the operation screen G4.

In such a case, the content to display the preview image 106 may be registered in advance with the item of the extract display setting 28d corresponding to the operation screen G4 in the content registration information 28 so that the preview image 106 is enlarged and displayed on the second screen 200 as illustrated in FIG. 9B. To be more specific, once the orientation of the display device 3 is changed to the second orientation, the second display controller 42 extracts the content to display in the remaining display area R2 based on the item of the extract display setting 28d corresponding to the operation screen G4. If the content showing the preview image 106 is included in the item of the extract display setting 28d corresponding to the operation screen G4, the second display controller 42 extracts the preview image 106 from the operation screen G4 and arranges the extracted preview image 106 in the remaining display area R2. As a result, the second screen 200 of FIG. 9B is displayed. Even when the display device 3 is in the second orientation, the user is allowed to check the preview image 106.

Once the attitude of the display device 3 is changed from the second orientation to the first orientation, the display unit 23 returns to the state displaying the first screen 100 of FIG. 9A from the state displaying the second screen 200 of FIG. 9B.

Figure 10A:
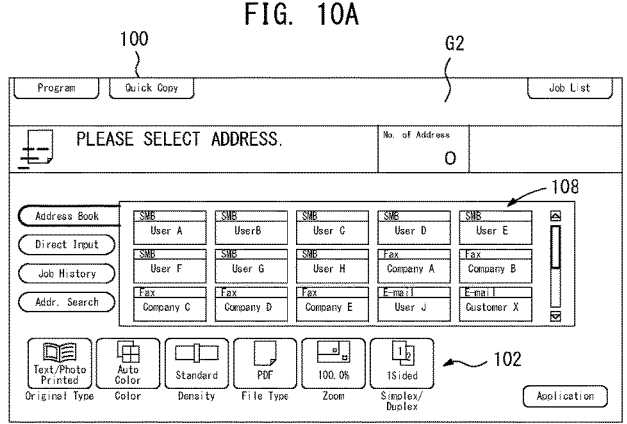
FIGS. 10A and 10B illustrate an example of the second screen on which multiple contents are scroll displayed.
Figure 10B:
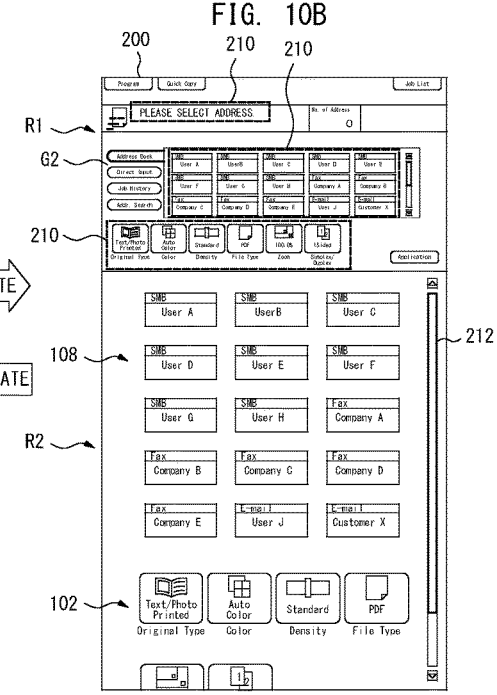

When creating the second screen 200, all of the multiple contents to be arranged in the remaining display area R2 may not fit in the remaining display area R2. In such a case, the second display controller 42 arranges the multiple contents in the remaining display area R2 in a manner that may be scrolled. FIGS. 10A and 10B illustrate an example of the first screen 100 and the second screen 200 in such a case. FIG. 10A illustrates the first screen 100 displayed when the display device 3 is in the first orientation, and FIG. 10B illustrates the second screen 200 displayed when the display device 3 is in the second orientation.

FIG. 10A illustrates an example when the operation screen G2 is the address selection screen in response to selection of the scan function by the user. The operation screen G2 includes the multiple operation buttons 102 for the user to configure the scan settings and multiple operation buttons 108 corresponding to respective multiple destinations registered in advance with the image processing device 1. All of the multiple operation buttons 102 and 108 may be registered as the contents to be arranged in the remaining display area R2 with the item of the extract display setting 28d in the content registration information 28. In such a case, the second display controller 42 arranges all of the multiple operation buttons 102 and 108 in the remaining display area R2 in creating the second screen 200. All of the multiple operation buttons 102 and 108 may not fit in the remaining display area R2 without reduction in sizes. The second display controller 42 then arranges a scroll bar 212 in a right end of the remaining display area R2, and displays the multiple operation buttons 102 and 108 in a manner those may be scroll displayed as illustrated in FIG. 10B. When the second screen 200 is displayed, the user scrolls the remaining display area R2 to see all of the multiple operation buttons 102 and 108. Hence, the user is allowed to operate his or her intended operation button. More specifically, the user may operate his or her intended operation button with maintaining the second orientation without changing the attitude of the display device 3 to the first orientation, resulting in better operability.

Figure 11:
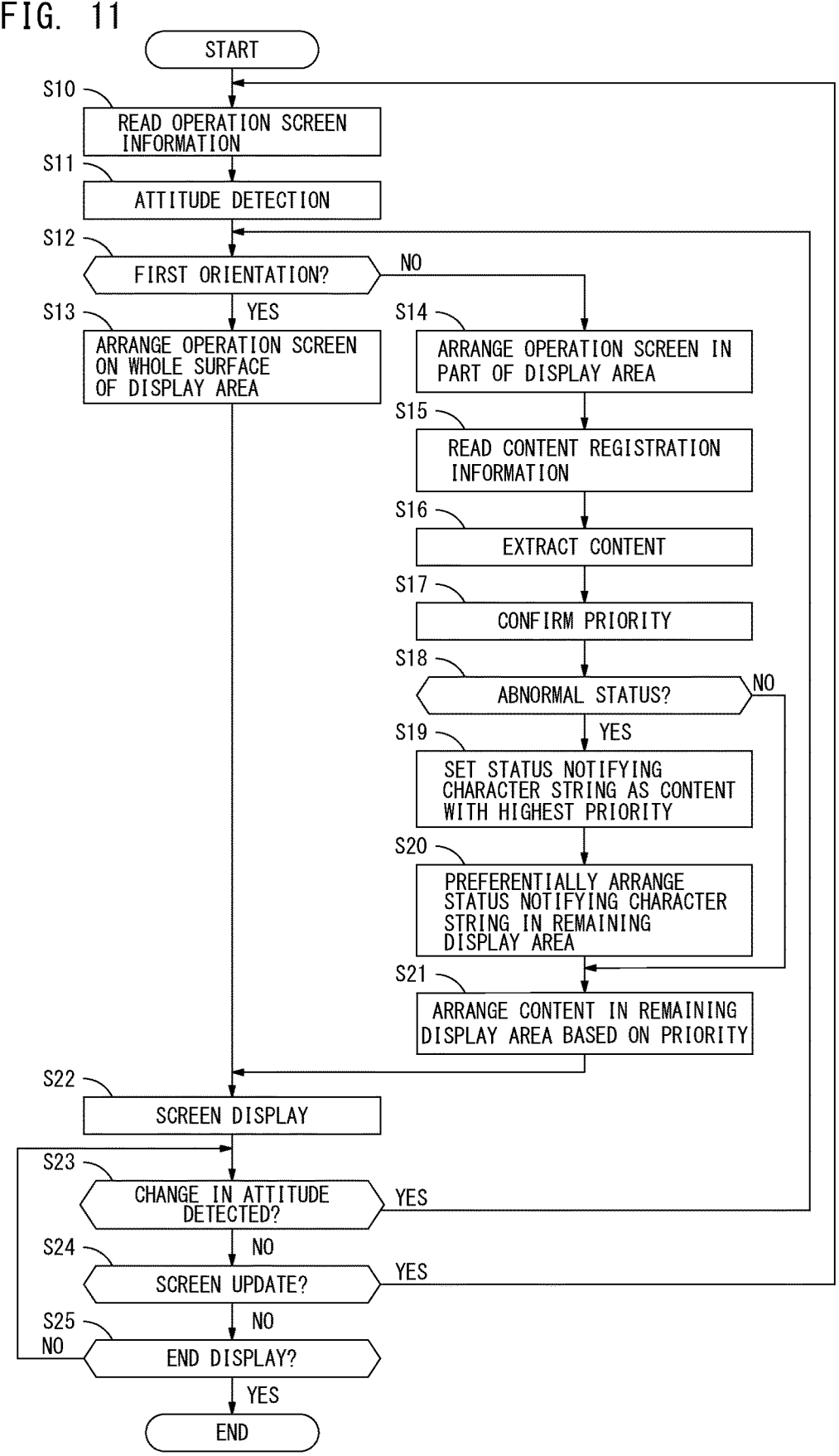
FIG. 11 illustrates a flow diagram explaining an exemplary procedure of a process performed at the display device.

A process sequence performed at the display device 3 is explained next. FIG. 11 illustrates a flow diagram explaining an exemplary procedure of a process performed at the display device 3. This process is performed when the CPU 20 of the display device 3 executes the program 26.

Upon start of the process, the display device 3 reads the operation screen information 27, and obtains the operation screen to display on the display unit 23 from the operation screen information 27 (step S10). The display device 3 detects the attitude of the display device 3 based on the output from the attitude detecting sensor 25 (step S11). More specifically, the display device 3 detects whether the current attitude is either the first orientation or the second orientation. The display device 3 determines if the current attitude is the first orientation (step S12). The current attitude may be the first orientation (when a result of step S12 is YES). In this case, the display device 3 arranges the operation screen obtained in step S10 on the whole surface of the display area R of the display unit 23 (step S13). The first screen 100 to display on the display unit 23 while the display device 3 is in the first orientation is then created.

The current attitude of the display device 3 may be the second orientation (when a result of step S12 is NO). In this case, the display device 3 reduces the operation screen obtained in step S10 and arranges the reduced operation screen in the part of the display area R1 of the display unit 23 (step S14). The display device 3 reads the content registration information 28 (step S15), and extracts the content included in the operation screen based on the content registration information 28 (step S16). The display device 3 also confirms the priority of each content registered with the content registration information 28 (step S17).

The display device 3 checks the current status of the image processing device 1 managed by the status managing unit 33, and determines whether the current status is the abnormal status (step S18). The image processing device 1 may be in the abnormal status (when a result of step S18 is YES). In this case, the display device 3 most preferentially sets the character strings showing the status of the image processing device 1, namely the character strings forming the massage notifying the abnormal status as the highest priority content (step S19), and preferentially arranges the character strings in the remaining display area R2 (step S20). Consequently, if the image processing device 1 is in the abnormal status, the content notifying the abnormal status is arranged in the remaining display area R2 with priority higher than the highest priority of the content registered with the content registration information 28. After preferentially arranging the content notifying the abnormal status, the display device 3 arranges each content set registered as the item of the content 28b in the content registration information 28 in the remaining display area R2 based on the priorities checked in step S17. The image processing device 1, on the other hand, may not be in the abnormal status, that means it may be in the normal status (when a result of step S18 is NO). In this case, the display device 3 arranges each content registered as the item of the content 28b in the content registration information 28 in the remaining display area R2 based on the priorities checked in step S17 (step S21). As described above, the second screen 200 to be displayed on the display unit 23 when the display device 3 is in the second orientation is created.

The display device 3 then displays the first screen 100 created in step S13 or the second screen 200 created in steps S14 to S21 on the display unit 23 (step S22). After displaying the first screen 100 or the second screen 200, the display device 3 determines if the change in the attitude is detected (step S23). When the change in the attitude is detected (when a result of step S23 is NO), the step returns to step S12 to repeat the above-described process.

The change in the attitude may not be detected (when a result of step S23 is NO). In this case, the display device 3 determines necessity of the update of the operation screen (step S24). When the operation screen is required to be updated in response to the user operation, the display device 3 determines YES in step S24. When the operation screen is required to be updated (when a result of step S24 is YES), the step proceeded by the display device 3 returns to step S10 to repeat the above-described process.

The update of the operation screen may not be required (when a result of step S24 is NO). In this case, the display device 3 determines whether or not to end the display process to display on the display unit 23 (step S25). When not ending the display process (when a result of step S25 is NO), the step proceeded by the display device 3 returns to step S23 and repeats the above-described process. The power supply to the display device 3 may be terminated, for example. In such a case, the display ends (when a result of step S25 is YES), and the process by the display device 3 ends.

As described above, the display device 3 of the first preferred embodiment includes the first display controller 41 and the second display controller 42. The first display controller 41 detects whether the orientation of the display unit 23 with the rectangular display area is the first orientation or the second orientation. If the display device 3 is in the first orientation, the first display controller 41 displays the first screen 100 on which the user operable operation screen is arranged on the whole surface of the display area on the display unit 23. If the display device 3 is in the second orientation, the second display controller 42 reduces the operation screen and arranges the reduced operation screen in the part of the display area R1. The second display controller 42 also arranges the content included in the operation screen in the remaining display area R2 of the display area. The second display controller 42 then displays the second screen including the part of the display area R1 and the remaining display area R2. The display device 3 with the above-described structure enables to solve a problem that the user may not perform his or her intended operation when the change in the orientation of the display device 3 is made. Also, this may avoid degradation of the user operability. Moreover, the user-friendly screen may be displayed.

The image processing device 1 includes the job controller 15 that controls the job processing based on the user operation detected by the display device 3. While the first screen 100 is displayed by the first display controller 41, the job controller 15 controls the job processing based on the user operation performed to the operation screen displayed in the whole display area R of the display unit 23. While the second screen 200 is displayed by the second display controller 42, the job controller 15 controls the job processing based on the user operation performed to the operation screen which is reduced and displayed in the part of the display area R1 of the display unit 23 or the content displayed in the remaining display area R2 of the display unit 23. Hence, regardless of whether the display device 3 is in the first orientation or the second orientation, the image processing device 1 of the first preferred embodiment is enabled to process the job based on the user operation to the first screen 100 or the second screen 200, and serve as the convenient device for the user.

As described above, even when the attitude of the display device is rotated by 90 degrees, the screen easy for the user to use may be displayed without the degradation of the operability.

Second Preferred Embodiment

The second preferred embodiment is explained next. According to the above-described first preferred embodiment, the operation screen information 27 and the content registration information 28 is stored in the storage 21 of the display device 3. The CPU 20 of the display device 3 serves as the display controller 30, and the screen to display on the display unit 23 is switched to either the first screen 100 or the second screen 200 in accordance with the attitude of the display device 3. In the second preferred embodiment, on the other hand, control of switching the screen to display on the display device 3 is carried out at the device body 2.

Figure 12:
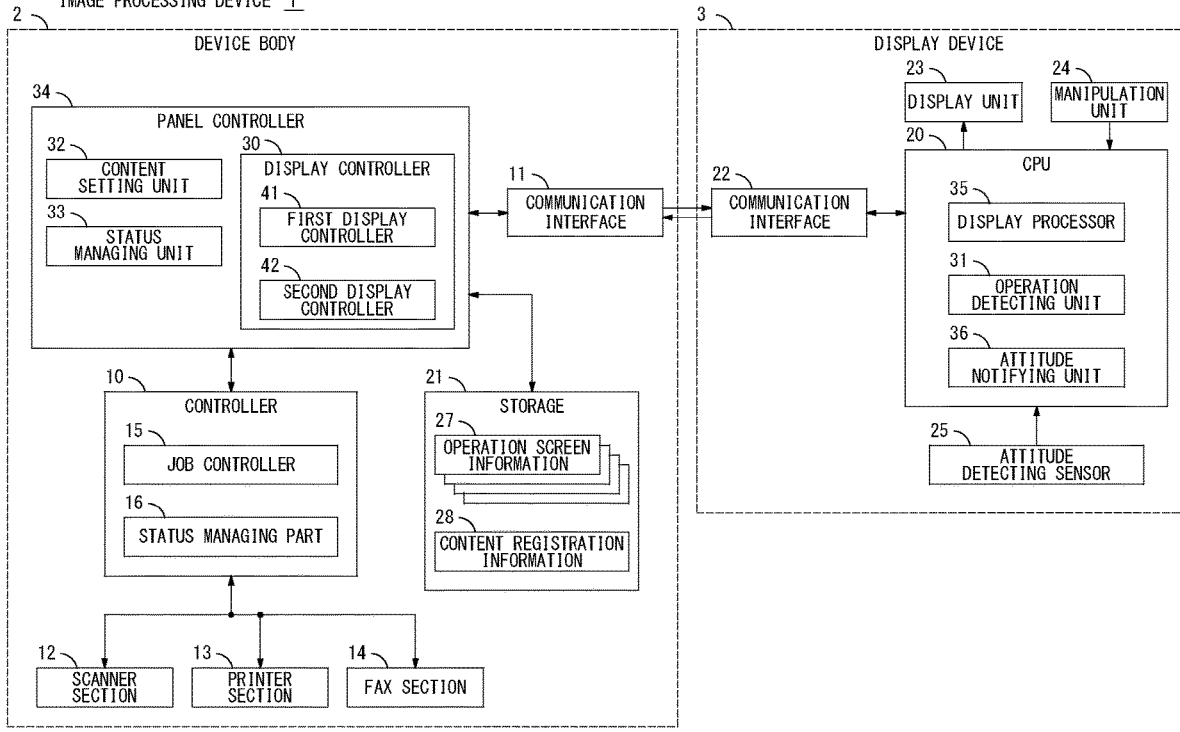
FIG. 12 illustrates a block diagram showing an example of a hardware structure and a functional structure of the image processing device in which a second preferred embodiment may be practiced.

FIG. 12 illustrates a block diagram showing an example of a hardware structure and a functional structure of the image processing device 1 in which the second preferred embodiment may be practiced. As illustrated in FIG. 12, the device body 2 of the second preferred embodiment includes a panel controller 34 and the storage 21 in addition to the structure explained in the first preferred embodiment. The storage 21 is the same as one provided with the display device 3 of the first preferred embodiment. The operation screen information 27 and the content registration information 28 is stored in the storage 21.

The panel controller 34 controls the display device 3. The panel controller 34 includes a CPU and a memory which are not illustrated in FIG. 12. The CPU executes a predetermined program so that the panel controller 34 serves as the display controller 30, the content setting unit 32 and the status managing unit 33. The display controller 30 includes the first display controller 41 and the second display controller 42. To be specific, the image processing device 1 in which the second preferred embodiment may be practiced is configured to function the display controller 30, the content setting unit 32 and the status managing unit 33 as explained in the first preferred embodiment in the device body 2.

In contrast, the CPU 20 executes the predetermined program so that the display device 3 serves as a display processor 35, the operation detecting unit 31 and an attitude notifying unit 36. The display processor 35 displays the first screen 100 or the second screen 200 received from the display controller 30 of the device body 2. The operation detecting unit 31 generates the operation information and outputs the generated operation information to the device body 2 based on the user operation received by the manipulation unit 24. Consequently, the display controller 30 of the device body 2 may update the first screen 100 or the second screen 200 in response to the user operation. The attitude notifying unit 36 notifies the device body 2 of the attitude of the display device 3 detected by the attitude detecting sensor 25.

The image processing device 1 in which the second preferred embodiment may be practiced enables the display controller 30 that becomes operative in the device body 2 to carry out control of switching the screen displayed on the display unit 23 to either the first screen 100 or the second screen 200 in accordance with the attitude of the display device 3. Even with this structure, the same working effect as that explained in the first preferred embodiment may be obtained.

A part of the functions of the display device 3 explained in the first preferred embodiment is equipped with the device body 2 of the image processing device 1 in which the second preferred embodiment may be practiced. The image processing device 1 in which the second preferred embodiment may be practiced operates as the display device 3 as explained in the first preferred embodiment as a whole.

Everything else except for the above-described points is the same as that explained in the first preferred embodiment.

Although the embodiments of the present invention have been described and illustrated in detail, it is clearly understood that the same is by way of illustration and example only and not limitation, the scope of the present invention should be interpreted by terms of the appended claims.

(Modifications)

While the preferred embodiments of the present invention have been described above, the present invention is not limited to the preferred embodiments. Various modifications may be applied to the present invention.

In the above-described preferred embodiments, for example, the basic attitude of the display device 3 is the first orientation which is where a longitudinal direction of the display unit 23 is in a right and left direction (landscape direction) as illustrated in FIG. 1A. When the display device 3 is in the first orientation, it displays the operation screen on the whole surface of the display area. When the display device 3 is in the second orientation, it reduces the operation screen and displays the reduced screen in the part of the display area R1 of the display unit 23. Moreover, when the display device 3 is the second orientation, it does not reduce the content included in the operation screen and displays the content without reduction in the remaining display area R2. The orientation of the display device 3 when it is in the basic attitude may be opposite from the orientation explained in the above-described preferred embodiments.

FIGS. 13A and 13B illustrate an example of the screens when the orientation that enables the longitudinal direction of the display unit 23 to be in the upper/lower direction (portrait direction) is the basic attitude (first orientation). When the display unit 23 is in the basic attitude as illustrated in FIG. 13A, the operation screen is displayed on the whole surface of the display unit 23. When the attitude of the display unit 23 is changed to the attitude rotated by 90 degrees (second orientation) based on the basic attitude as illustrated in FIG. 13B, the screen on which the reduced operation screen is arranged in the part of the display area R1 of the display unit 23 and the content included in the operation screen is arranged in the remaining display area R2 may be displayed.

The above-described display device 3 may be constructed by a device such as a general tablet terminal. To be more specific, the display device 3 does not have to be a device equipped exclusive for the image processing device 1. The display device 3 may be realized by using the device such as the general tablet terminal. In such a case, the above-described program 26 is installed and executed on the general display device 3 so that the screen to display on the display unit 23 may be switched depending on whether the attitude of the display device 3 is the first orientation or the second orientation. This may cause the same working effect as described above.

The display device 3 of the above-described preferred embodiments is installed as a display part of the image processing device 1. However, this is given not for limitation. The display device 3 does not only have to be used as the display part of the image processing device 1. More specifically, the above-described display device 3 may be applied to the device other than the image processing device 1.

The above-described program 26 is installed in advance in the display device 3. The program 26 does not always have to be installed in advance in the display device 3. The program 26 may be the target of trading. The program 26 then may be provided over an internet, or may be provided in a manner that is recorded on a computer readable recording medium such as a CD-ROM.

What is claimed is:

1. A display device, with a display part having a rectangular display area, capable of changing an orientation of said display part between a first orientation and a second orientation rotated by 90 degrees from said first orientation, comprises:

a hardware processor that:
  detects whether the orientation of said display part is either said first orientation or said second orientation;
  displays a first screen on which an operation screen operable for a user is arranged on a whole surface of said display area on said display part when the orientation of said display part is said first orientation; and
  displays a second screen on which reduced said operation screen is arranged in a part of said display area and a content included in said operation screen is arranged in a remaining part of said display area on said display part when the orientation of said display part is said second orientation.

2. The display device according to claim 1, wherein the content arranged in the remaining part of said display area includes a preview image, a character string or an operation button.

3. The display device according to claim 1, further comprising:
a storage that stores content registration information as which the content to be arranged in the remaining part of said display area in said second screen is registered in advance, wherein
the hardware processor arranges the content included in said operation screen in the remaining part of said display area based on said content registration information, and creates said second screen when the orientation of said display part is said second orientation.

4. The display device according to claim 3, wherein the hardware processor creates said second screen corresponding to updated said operation screen based on said content registration information corresponding to updated said operation screen when said operation screen is updated while said second screen is displayed on said display part.

5. The display device according to claim 3, wherein the hardware processor further registers or updates the content with said content registration information based on user operation.

6. The display device according to claim 1, wherein the hardware processor arranges the content included in said operation screen in a size equal to or larger than a size of a content displayed on said first screen when the content is to be arranged in the remaining part of said display area.

7. The display device according to claim 1, wherein the hardware processor arranges multiple contents that should be arranged in the remaining part of said display area in a manner those may be scroll displayed when all of said multiple contents cannot be arranged in the remaining part of said display area.

8. The display device according to claim 1, wherein the hardware processor further manages a status, and
while said status is normal status, the hardware processor preferentially arranges the operation button operable for the user when arranging the multiple contents in the remaining part of said display area.

9. The display device according to claim 8, wherein the hardware processor preferentially arranges the character string notifying abnormal status when arranging the multiple contents in the remaining part of said display area while said status is said abnormal status.

10. The display device according to claim 1, wherein when the content included in said operation screen is arranged and displayed in the remaining part of said display area, the hardware processor displays a position that includes the content in said operation screen which is reduced and arranged in the part of said display area.

11. The display device according to claim 1, wherein the hardware processor enables to receive the user operation to the said operation screen which is reduced and arranged in the part of said display area, and also to the content arranged in the remaining part of said display area.

12. An image processing device, with a display part having a rectangular display area, capable of changing an orientation of said display part between a first orientation and a second orientation rotated by 90 degrees from said first orientation, comprises:
a hardware processor that:
detects whether the orientation of said display part is either said first orientation or said second orientation;
displays a first screen on which an operation screen operable for a user is arranged on a whole surface of said display area on said display part when the orientation of said display part is said first orientation;
displays a second screen on which reduced said operation screen is arranged in a part of said, display area and a content included in said operation screen is arranged in a remaining part of said display area on said display part when the orientation of said display part is said second orientation; and
controls processing of a job based on user operation to said operation screen which is displayed on the whole surface of said display area while said first screen is being displayed, and controls the processing of the job based on the user operation to said operation screen reduced and displayed in the part of said display area or to the content displayed in the remaining part of said display area while said second screen is being displayed.

13. The image processing device according to claim 12, wherein
the content arranged in the remaining part of said display area includes a preview image, a character string or an operation button.

14. The image processing device according to claim 12, further comprising:
a storage that stores content registration information as which the content to be arranged in the remaining part of said display area in said second screen is registered in, advance, wherein
the hardware processor arranges the content included in said operation screen in the remaining part of said display area based on said content registration information, and creates said second screen when the orientation of said display part is said second orientation.

15. The image processing device according to claim 14, wherein
the hardware processor creates said second screen corresponding to updated said operation screen based on said content registration information corresponding to updated said operation screen when said operation screen is updated while said second screen is displayed on said display part.

16. The image processing device according to claim 14, wherein
the hardware processor further registers or updates the content with said content registration information based on the user operation.

17. The image processing device according to claim 12, wherein
the hardware processor arranges the content included in said operation screen in a size equal to or larger than a size of a content displayed on said first screen when the content is to be arranged in the remaining part of said display area.

18. The image processing device according to claim 12, wherein
the hardware processor arranges multiple contents that should be arranged in the remaining part of said display area in a manner those may be scroll displayed when all of said multiple contents cannot be arranged in the remaining part of said display area.

19. The image processing device according to claim 12, wherein
said hardware processor further manages a status of said image processing device, and
while said status is normal status, the hardware processor preferentially arranges the operation button operable for the user when arranging the multiple contents in the remaining part of said display area.

20. The image processing device according to claim 19, wherein
the hardware processor preferentially arranges the character string notifying abnormal status when arranging the multiple contents in the remaining part of said display area while said status is said abnormal status.

21. The image processing device according to claim 12, wherein
when the content included in said operation screen is arranged and displayed in the remaining part of said display area, the hardware processor displays a position that includes the content in said operation screen which is reduced and arranged in the part of said display area.

22. The image processing device according to claim 12, further comprising:
an image reader that reads an image of a document and generates image data, wherein
the hardware processor arranges and displays the preview image based on the image data generated by said image reader in the remaining part of said display area.

23. A non-transitory recording medium storing a computer readable program to be executed by a hardware processor in a display device, with a display part having a rectangular display area, capable of changing an orientation of said display part between a first orientation and a second orientation rotated by 90 degrees from said first orientation, execution of the computer readable program by the hardware processor in said display device causing the hardware processor to perform:
detecting whether the orientation of said display part is either said first orientation or said second orientation;
displaying a first screen on which an operation screen operable for a user is arranged on a whole surface of said display area on said display part when the orientation of said display part is said first orientation; and
displaying a second screen on which reduced said operation screen is arranged in a part of said display area and a content included in said operation screen is arranged in a remaining part of said display area on said display part when the orientation of said display part is said second orientation.

\* \* \* \* \*